(12) United States Patent  
Abram et al.

(10) Patent No.: US 9,376,947 B2  
(45) Date of Patent: Jun. 28, 2016

(54) HYBRID VALVE FOR ATTENUATION OF LOW FREQUENCY NOISE

(71) Applicant: Faurecia Emissions Control Technologies, Columbus, IN (US)

(72) Inventors: Kwin Abram, Columbus, IN (US); Joseph Callahan, Greenwood, IN (US); Robin Willats, Columbus, IN (US)

(73) Assignee: Faurecia Emissions Control Technologies USA, LLC, Columbus, IN (US)

( * ) Notice: Subject to any disclaimer, the term of this patent is extended or adjusted under 35 U.S.C. 154(b) by 255 days.

(21) Appl. No.: 13/664,467

(22) Filed: Oct. 31, 2012

(65) Prior Publication Data

US 2013/0056083 A1    Mar. 7, 2013

Related U.S. Application Data

(63) Continuation-in-part of application No. 11/950,034, filed on Dec. 4, 2007, now Pat. No. 8,453,672, which is a continuation-in-part of application No. 11/692,964, filed on Mar. 29, 2007, now Pat. No. 7,748,404.

(60) Provisional application No. 60/989,508, filed on Nov. 21, 2007.

(51) Int. Cl.  
*F16K 15/03*    (2006.01)  
*F01N 1/08*    (2006.01)  
*F01N 1/16*    (2006.01)  
*F02D 9/04*    (2006.01)  
*F02D 9/10*    (2006.01)  
*F01N 13/08*    (2010.01)

(52) U.S. Cl.  
CPC  *F01N 1/08* (2013.01); *F01N 1/165* (2013.01); *F02D 9/04* (2013.01); *F02D 9/103* (2013.01); *F01N 13/085* (2013.01); *F01N 2240/36* (2013.01); *F01N 2410/00* (2013.01); *F16K 15/033* (2013.01); *Y10T 137/0324* (2015.04); *Y10T 137/7898* (2015.04)

(58) Field of Classification Search  
CPC ......... F16K 31/44; F16K 15/033; F01N 1/08; F01N 1/165; F01N 2240/36; F02D 9/04; F02D 9/103  
USPC ............ 137/527; 267/67, 70, 71; 251/83, 77, 251/129.19, 82  
See application file for complete search history.

(56) References Cited

U.S. PATENT DOCUMENTS

| | | |
|---|---|---|
| 1,330,265 A | 2/1920 | Grant |
| 1,375,621 A | 4/1921 | Wright, Jr. |
| 1,635,842 A | 7/1927 | Hirshstein |
| 1,666,005 A | 4/1928 | Culp |
| 2,492,784 A | 12/1949 | Christman |

(Continued)

*Primary Examiner* — Kevin Lee  
*Assistant Examiner* — P. Macade Nicholas  
(74) *Attorney, Agent, or Firm* — Carlson, Gaskey & Olds, PC

(57) ABSTRACT

A hybrid valve assembly for an exhaust system includes an exhaust tube having a bore defining an exhaust flow path. A vane is mounted within the bore and is moveable between an open position and a closed position. A resilient member biases the vane toward the closed position. A valve actuator has an ON position where movement of the vane is actively controlled by the valve actuator and an OFF position where movement of the vane is passively controlled by exhaust gas flow.

33 Claims, 5 Drawing Sheets

(56) References Cited

U.S. PATENT DOCUMENTS

| | | | |
|---|---|---|---|
| 2,766,768 A | 10/1956 | Brown | |
| 2,895,562 A | 7/1959 | Perry | |
| 2,947,392 A | 8/1960 | Lawrence | |
| 3,234,924 A | 2/1966 | May | |
| 3,300,137 A | 1/1967 | Murphy | |
| 3,897,852 A | 8/1975 | Hoffman et al. | |
| 4,261,383 A * | 4/1981 | Prince | F16K 15/181 137/270 |
| 4,586,534 A | 5/1986 | McNeely | |
| 4,699,244 A | 10/1987 | Bergquist et al. | |
| 5,189,266 A * | 2/1993 | Sasaki et al. | 181/227 |
| 5,305,787 A | 4/1994 | Thygesen | |
| 5,355,673 A | 10/1994 | Sterling et al. | |
| 5,401,001 A * | 3/1995 | Cook et al. | 251/308 |
| 5,709,241 A | 1/1998 | Iwata | |
| 5,744,762 A | 4/1998 | Seki et al. | |
| 6,123,318 A | 9/2000 | Forbes et al. | |
| 6,425,412 B2 | 7/2002 | Sterling | |
| 6,454,047 B1 | 9/2002 | Galaitsis | |
| 6,633,646 B1 | 10/2003 | Hwang | |
| 6,637,449 B2 | 10/2003 | Nagai et al. | |
| 6,854,709 B2 | 2/2005 | Kawai et al. | |
| 7,040,451 B2 | 5/2006 | Schumacher et al. | |
| 7,374,147 B2 * | 5/2008 | Nohl et al. | 251/129.04 |
| 7,401,592 B2 | 7/2008 | Willats et al. | |
| 7,428,947 B2 | 9/2008 | Nohl et al. | |
| 7,451,854 B2 | 11/2008 | Suzuki et al. | |
| 7,536,990 B2 * | 5/2009 | Willats et al. | 123/323 |
| 7,581,710 B2 | 9/2009 | Abram et al. | |
| 7,628,250 B2 | 12/2009 | Abram et al. | |
| 7,748,404 B2 | 7/2010 | Abram et al. | |
| 7,836,945 B2 | 11/2010 | Speer | |
| 2005/0189166 A1 | 9/2005 | Kiikuchi et al. | |
| 2008/0083218 A1 | 4/2008 | Abram et al. | |

* cited by examiner

HYBRID VALVE FOR ATTENUATION OF LOW FREQUENCY NOISE

RELATED APPLICATIONS

This application is a continuation-in-part of application Ser. No. 11/950,034, filed on Dec. 4, 2007, now U.S. Pat. No. 8,453,672, which is a continuation-in-part of application Ser. No. 11/692,964 filed on Mar. 29, 2007, now U.S. Pat. No. 7,748,404, and claims priority to provisional application No. 60/989,508 filed on Nov. 21, 2007.

TECHNICAL FIELD

The subject invention relates to a hybrid valve assembly in a vehicle exhaust system, and more particularly to a hybrid valve assembly that selectively provides a passive valve function or an actively controlled function to provide a desired valve characteristic.

BACKGROUND OF THE INVENTION

Exhaust systems are widely known and used with combustion engines. Typically, an exhaust system includes exhaust tubes that convey hot exhaust gases from the engine to other exhaust system components, such as mufflers, resonators, etc. A muffler includes acoustic chambers that cancel out sound waves carried by the exhaust gases. Although effective, mufflers are often relatively large in size and provide limited noise attenuation.

It has been proposed to include a valve in the muffler to provide further noise attenuation. However, the proposed valves have numerous drawbacks that limit their widespread use in a variety of applications.

As known, the muffler is subjected to different operating conditions dependent upon application. For example, due to its usual position, a main muffler for a passenger car can be subjected to exhaust gases of 600 degrees Celsius, while mufflers used in truck, minivan or SUV applications are subjected to gas temperatures that can exceed 750 degree Celsius.

In passenger car applications, a passive noise attenuation valve has been directly incorporated within a muffler body to provide noise attenuation. This valve includes a spring for biasing a valve body for pivotable movement within a valve housing that defines an exhaust flow path. The spring has limited application in high temperature environments. Special high-temperature spring materials are often required, which can be very expensive. Also, these valves can be difficult to package in smaller sized mufflers, which are typically used as part of a multi-muffler configuration for larger vehicles such as trucks, SUVs, mini-vans, etc.

The valve controls exhaust flow rate along the exhaust flow path. The valve body is moveable between a closed position, where 100% of the exhaust flow path is blocked by the valve body, and an open position where blocking of the exhaust flow path is minimized.

Further, these known passive valves are used in a configuration where a by-pass flow path is provided. In this type of configuration, there is a primary flow path and a by-pass flow path for exhaust gases. The valve body is positioned within an internal muffler tube that defines the primary flow path. As discussed above, the valve body is configured to block 100% of the primary flow path when in the closed position. A by-pass tube is in fluid communication with the internal muffler tube at a position upstream of the valve body and at a position downstream of the valve body. Under certain conditions, such as when the primary flow path is 100% blocked for example, exhaust gases are directed around the valve body via the by-pass tube.

Providing by-pass flow paths is disadvantageous from an assembly, material, and weight perspective. Further, as discussed above, it is difficult to package these valves in smaller mufflers, and these valves are not able to operate effectively in high temperature environments.

Additionally, these known passive valve configurations do not effectively attenuate low frequency noise. Attempts have been made to improve low frequency noise attenuation without using passive valves by either increasing muffler volume or increasing backpressure. Increasing muffler volume is disadvantageous from a cost, material, and packaging space perspective. Increasing backpressure can adversely affect engine power.

Attempts have also been made to use a non-bypass configuration with an actively controlled, vacuum operated valve configuration. However, this is disadvantageous from a cost and packaging perspective.

Therefore, there is a need for a more effective noise attenuation valve that operates efficiently within the exhaust flow, and which can attenuate low frequency noise to provide a desired valve characteristic. This invention addresses those needs while avoiding the shortcomings and drawbacks of the prior art.

SUMMARY OF THE INVENTION

A hybrid valve assembly for an exhaust system includes an exhaust tube having a bore defining an exhaust flow path. A vane is mounted within the bore and is moveable between an open position and a closed position. A resilient member biases the vane toward the closed position. A valve actuator has an ON position where movement of the vane is actively controlled by the valve actuator and an OFF position where movement of the vane is passively controlled by exhaust gas flow.

In one example, the exhaust flow path has a cross-sectional area and the vane provides 87.5% to 92.5% coverage of the cross-sectional area when in the closed position.

In another example, the actuator comprises a linear actuator such as a solenoid, for example.

In another example, when the valve actuator is in the OFF position, the vane is solely movable from the closed position toward the open position in response to exhaust gas pressure being greater than a biasing force of the resilient member.

In another example, the assembly includes an input configured to be selectively actuated by a user to move the valve actuator between the ON and OFF positions. Selection between the ON and OFF positions is based upon providing a desired valve characteristic.

An example method of controlling a hybrid valve assembly includes selectively moving a valve actuator between an ON position where movement of the vane is actively controlled by the valve actuator and an OFF position where movement of the vane is passively controlled by exhaust gas flow.

These and other features of the present invention can be best understood from the following specification and drawings, the following of which is a brief description.

DETAILED DESCRIPTION OF THE PREFERRED EMBODIMENT

Figure 1:
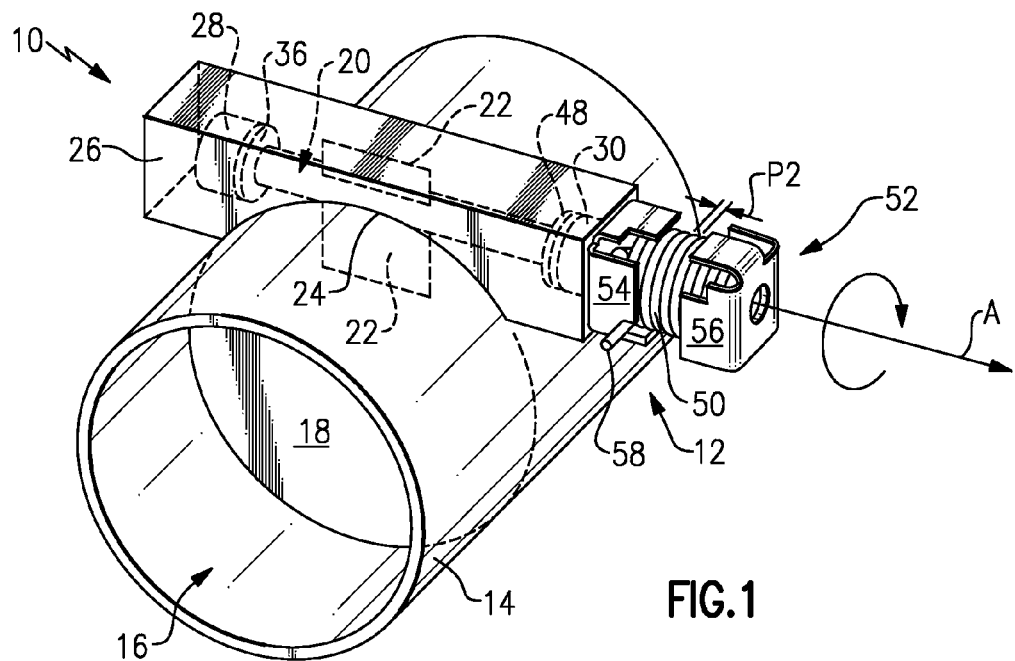
FIG. 1 shows a perspective view of an exhaust component and exhaust valve assembly incorporating the subject invention.

An exhaust component 10 (FIG. 1) includes an exhaust valve, referred to as a passive valve assembly 12, which is movable between an open position and a closed position. In the example shown, the exhaust component 10 comprises a tube body 14 that defines an exhaust gas flow path 16 having a specified cross-sectional area. The passive valve assembly 12 includes a valve body or vane 18 that blocks a portion of the exhaust gas flow path 16 when in the closed position. The vane 18 is pivoted toward the open position to minimize blockage of the exhaust gas flow path 16 in response to pressure exerted against the vane 18 by exhaust gases.

In one example the vane 18 is fixed to a shaft 20 with a tang or bracket 22. A slot 24 is formed within an outer surface of the tube body 14. A housing 26, shown in this example as a square metal structure, is received within this slot 24 and is welded to the tube body 14. Other housing configurations could also be used. The shaft 20 is rotatably supported within the housing 26 by first 28 and second 30 bushings or bearings. In the example shown, the bracket 22 comprises a piece of sheet metal that has one portion welded to the shaft 20 and another portion that extends outwardly from the housing 26 and is welded to the vane 18. Thus, the vane 18 and the shaft 20 pivot together about an axis A that is defined by the shaft 20. The bracket 22 is just one example of how the shaft 20 can be attached to the vane 18, it should be understood that other attachment mechanisms could also be used.

Figure 2:
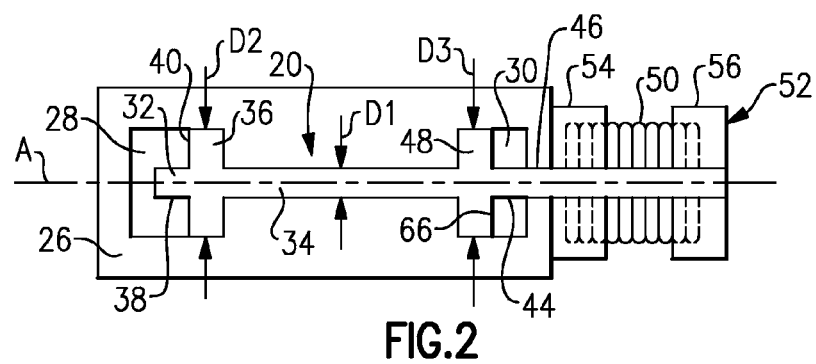
FIG. 2 shows a schematic view of a valve shaft, bushings, and spring as used in the assembly of FIG. 1.

The first bushing 28 is positioned generally at a first shaft end 32. As shown in FIG. 2, the first bushing 28 comprises a sealed interface for the first shaft end 32. The shaft 20 includes a shaft body 34 that is defined by a first diameter D1. Near the first shaft end 32 is a first collar 36 that is defined by a second diameter D2 that is greater than the first diameter D1. The first bushing 28 includes a first bore 38 that receives the first shaft end 32. The first collar 36 abuts directly against an end face 40 of the first bushing 28 such that exhaust gas cannot leak out of the first bushing 28 along a path between the shaft 20 and first bushing 28.

The second bushing 30 includes a second bore 44 through which the shaft body 34 extends to a second shaft end 46. The shaft 20 includes a second collar 48 that is defined by a third diameter D3 that is greater than the first diameter D1. The second D2 and third D3 diameters can be the same or different from each other. The second collar 48 is located axially inboard of the second bushing 30.

The shaft 20 extends through the second bore 44 to an axially outboard position relative to the second bushing 30. A resilient member, such as a spring 50 for example, is coupled to the second shaft end 46 with a spring retainer 52. The spring retainer 52 includes a first retainer piece 54 that is fixed to the housing 26 and a second retainer piece 56 that is fixed to the second shaft end 46. One spring end 58 is associated with housing via the first retainer piece 54 and a second spring end 60 (FIG. 3) is associated with the shaft 20 via the second retainer piece 56. Advantageously, the spring 50 is located external to, i.e. outside of, the tube body 14. As such, the spring 50 operates in a much cooler environment instead of being subjected directly to the high temperature exhaust gases as in prior designs.

In one example, the spring 50 comprises a coil spring that is configured to be compressed both in an axial direction along axis A and in a torsional direction about the axis A during installation. Torsional loading creates a preload force that biases the shaft 20 and the vane 18 toward the closed position. As gas flow increases, this torsional force is overcome to move the vane 18 toward the open position. The axial force serves to positively seat and seal the second collar 48 against an end face 66 of the second bushing 30. This prevents any exhaust gas from leaking out of the second bushing 30 by sealing off a passage between an outer surface of the shaft 20 and a bore surface of the second bushing 30. Thus, a single spring is used to provide both axial and torsional loading, resulting in a configuration that can both hold the passive valve assembly 12 in a desired operational position as well as preventing exhaust gas leakage.

Figure 3:
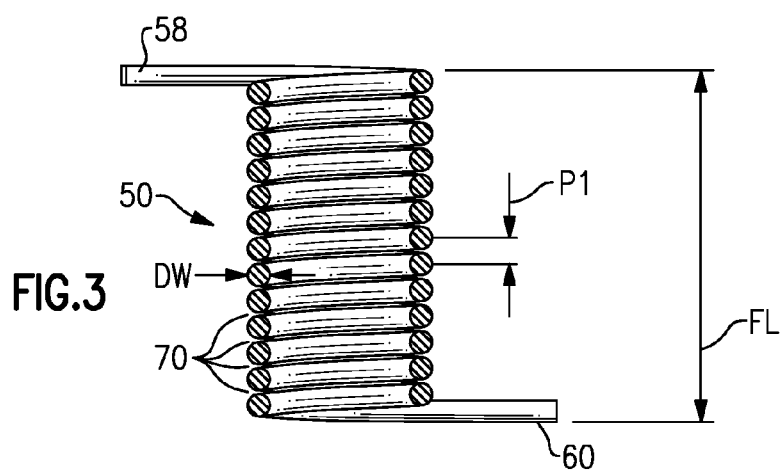
FIG. 3 shows a cross-sectional view of the spring of FIG. 2.

The spring 50 is shown in greater detail in FIG. 3. The spring 50 is a coil spring formed from wire having a diameter Dw. Prior to installation, the spring 50 is defined by a free length condition FL where a first pitch dimension P1 is greater than the diameter Dw. This relationship results in spacing between adjacent coils by a gap 70. The gaps 70 between adjacent coils enable the spring 50 to be compressed in the axial direction as well as in the torsional direction during installation. This results in a second pitch dimension P2 (FIG. 1) that is less than the first pitch dimension P1.

In one example configuration, the spring 50 has a wire diameter Dw that is approximately 1.8 mm, and a first pitch dimension P1 that is greater than 2 mm. The spring 50 also has an overall outer diameter of 17 mm and a free length FL of approximately 30 mm. When compressed for installation this free length FL is reduced by approximately 5 mm. It should be understood that this is just one example configuration and that other configurations could be used as needed to provide desired characteristics.

By utilizing a single spring that can act both in torsion and axially, the shaft can be loaded against the bushing, which will minimize exhaust gas leakage between the shaft and the bushing. Further, this configuration can be used to minimize build up variations because the shaft will always be positively located against the bushing.

The passive valve assembly 12 also provides a significant amount of coverage of the exhaust gas flow path 16 when in the closed position as compared to prior valves, which have 50% or less coverage when closed. In the example shown in FIGS. 4-5, the passive valve assembly 12 is positioned in an exhaust tube 80 having a first tube end 82 that is connected to a first exhaust component 84 and a second tube end 86 that is connected to a second exhaust component 88. The first 84 and second 88 exhaust components can comprise components such as a muffler, tailpipe, etc.

Figure 6:
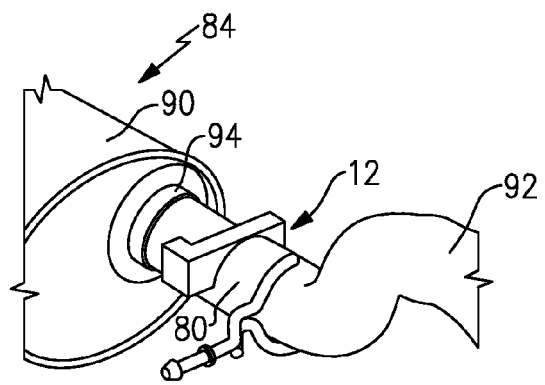
FIG. 6 is a perspective view of a muffler and an external exhaust tube with a passive valve assembly.

In one example, shown in FIG. 6, the first exhaust component 84 comprises a muffler 90 and the second exhaust component 88 comprises a tailpipe 92. The exhaust tube 80 is connected to an outlet 94 of the muffler 90 and an inlet to the tailpipe 92. In another example, both the first 84 and second 88 components comprise mufflers (schematically shown in FIG. 4) with the exhaust tube 80 being connected to an outlet from one muffler and to an inlet from another muffler.

In either configuration, the exhaust tube 80 has an internal bore or opening 98 that fluidly connects the first 84 and second 88 exhaust components and defines the exhaust gas flow path 16. The exhaust gas flow path 16 is sole flow path between the first 84 and second 88 exhaust components. In other words, there is no by-pass flow path associated with the exhaust tube 80 and the only path through which exhaust gases can flow is exhaust gas flow path 16 within the exhaust tube 80

Figure 4:
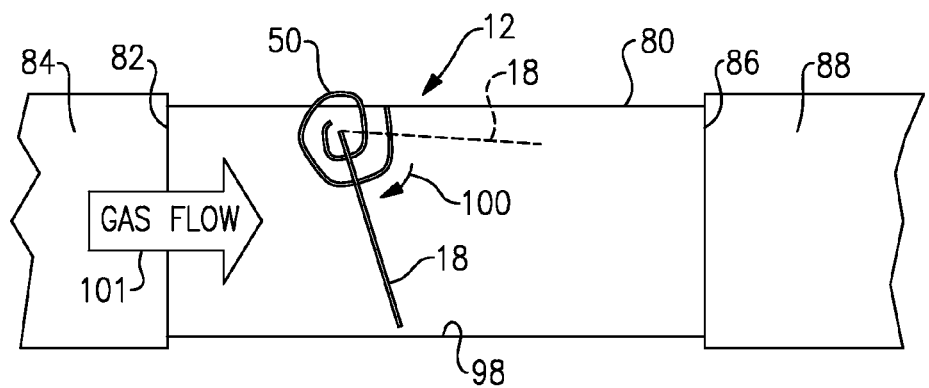
FIG. 4 is a schematic side view of a spring and vane showing substantially closed and open positions.
Figure 5:
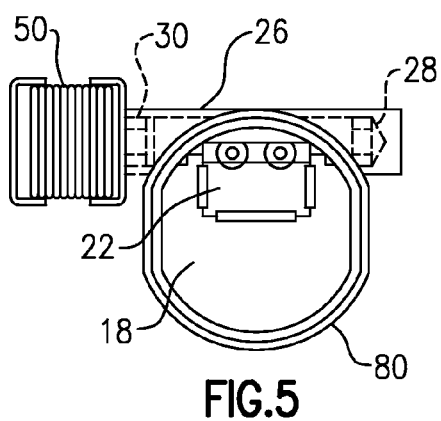
FIG. 5 is a cross-sectional end view of an external exhaust tube and passive valve assembly with the vane being in the substantially closed position.

As shown in FIG. 4, the vane 18 is pivotable within the opening 98 from a substantially closed position (solid line) to a substantially open position (dashed line). The vane 18 is biased by the spring 50 (shown schematically) toward the closed position as schematically indicated at 100. When exhaust gas pressure, indicated by arrow 101, exceeds a certain level, the spring force is overcome and the vane 18 is moved toward the open position.

The opening 98 is defined by a cross-sectional area. When the vane 18 is in the closed position, this cross-sectional area is covered, i.e. closed off, by approximately 80-97%. In one example, the cross-sectional area is covered within a range of 87.5-92.5%. Thus, only a very small part of the cross-sectional area is left open for exhaust gas flow when the vane 18 is in the closed position (see FIG. 5).

This high percentage of coverage, in combination with a non-bypass configuration, provides a very effective way to attenuate low frequency noise.

Figure 7:
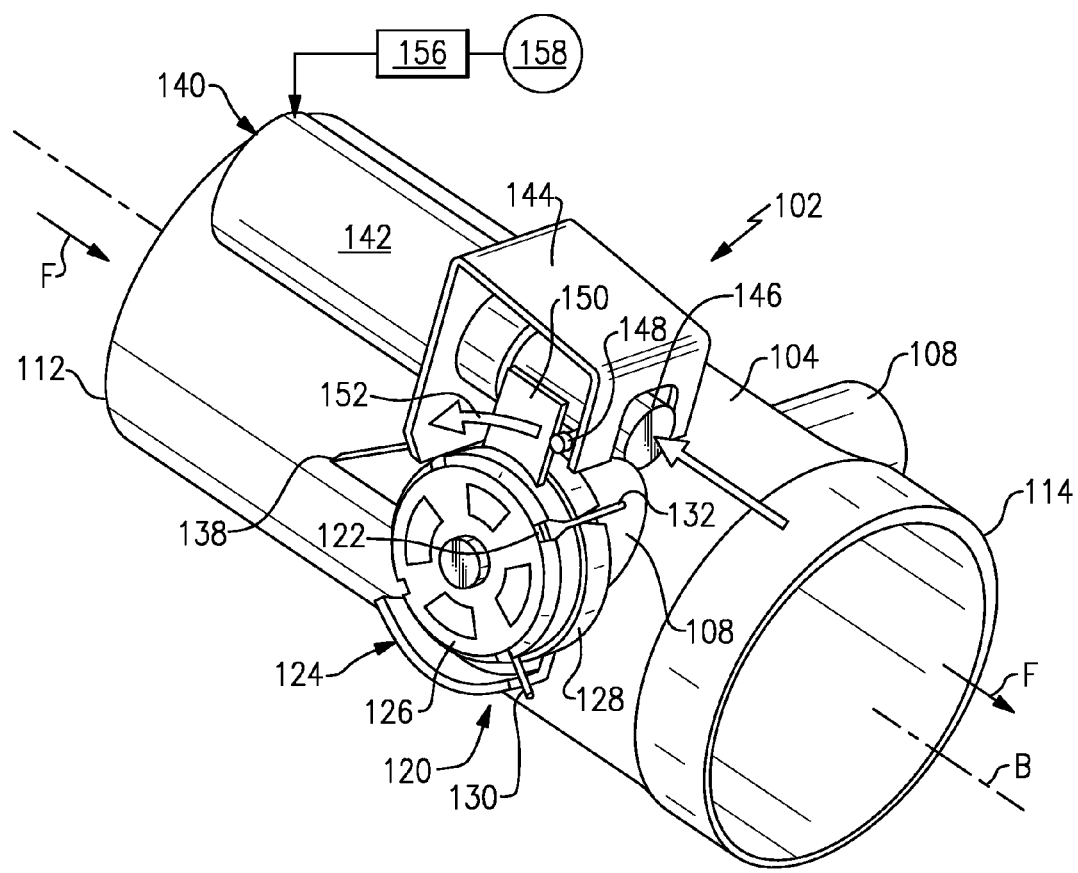
FIG. 7 is a perspective view of a hybrid valve assembly.
Figure 8:
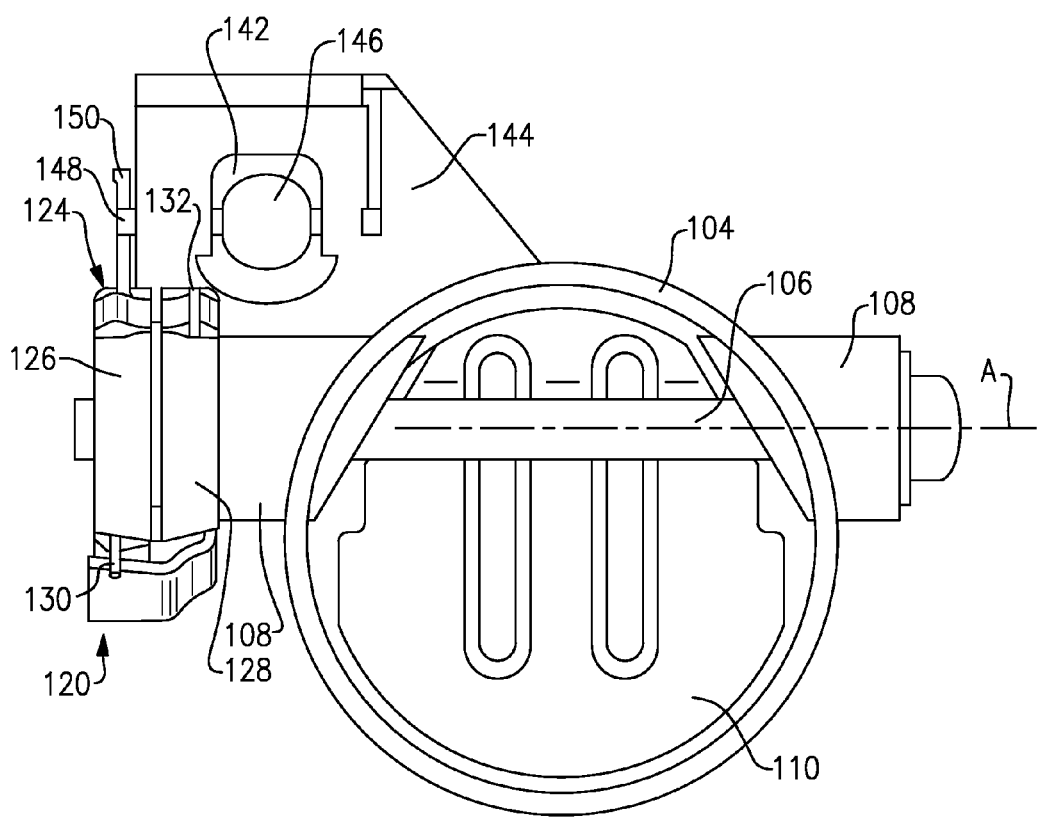
FIG. 8 is an end view of the hybrid valve assembly of FIG. 7.

FIGS. 7-10 show an example of a hybrid valve assembly 102 that combines passive control as described above with an active control that can be selectively actuated to provide a desired valve characteristic. As shown in FIG. 7, the hybrid valve assembly 102 is mounted within an exhaust tube 104 in a manner similar to that described above; however, other mounting configurations could also be used. The tube 104 has a center axis B and defines an exhaust gas flow path. A shaft 106 (FIG. 8) is supported by bushing assemblies 108 that are fixed on opposite sides of the tube 104. A vane 110 (FIG. 8) is fixed for rotation with the shaft 104 about the axis of rotation A.

In one example, the tube 104 defines a cross-sectional area through which exhaust gases flow F from an upstream end 112 to a downstream end 114. The tube 104 comprises a non-bypass configuration with the exhaust path comprising the sole exhaust path between upstream and downstream exhaust components connected to the upstream 112 and downstream 114 ends. When the vane 110 is in the closed position, this cross-sectional area is covered approximately 80-97% by the vane 110. In another example, the cross-sectional area is covered within a range of 87.5-92.5%. Thus, only a very small part of the cross-sectional area is left open for exhaust gas flow when the vane 110 is in the closed position (see FIG. 8).

The hybrid valve assembly 102 includes a resilient control assembly 120 that biases the vane 110 to the closed position. The resilient control assembly 120 includes a resilient member 122, such as a spring for example, that exerts a biasing force to move the vane 110 to the closed position. The resilient control assembly 120 also includes a retainer 124 that couples the resilient member 122 to the shaft 106. The retainer 124 includes a first portion 126 that is fixed for rotation with one end of the shaft 106 and a second portion 128 that is fixed to the tube 104 and/or an outer housing of one of the bushing assemblies 108. As shown in FIG. 7, a first spring end 130 is seated in the first portion 126 and a second spring end 132 is seated in the second portion 128 of the spring retainer 124.

The hybrid valve assembly 102 also includes a valve actuator 140 that is configured to actively control a position of the vane 110. Any type of active valve actuator 140 can be used including a pneumatically or electrically controlled actuator, for example. In one example, the actuator comprises a linear actuator such as a solenoid.

In one example mounting configuration, the valve actuator 140 includes a housing 142 that is fixed to the tube 104 with a bracket 144. The housing 142 is externally mounted and extends generally in a direction parallel to that of the exhaust gas flow path. The valve actuator 140 includes an extendible member 146 that extends inwardly and outwardly of the housing 142 along a linear path to control the position of the vane 110. An arm 148 extends outwardly from the extendible member 146 to engage the resilient control assembly 120. In one example, the arm 148 extends in a direction that is generally parallel with the axis of rotation A.

Figure 9:
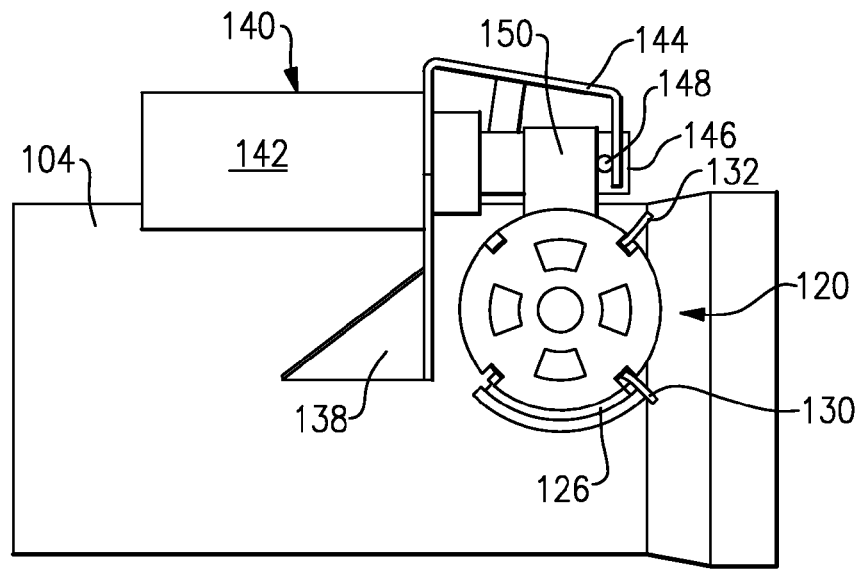
FIG. 9 is a side view of the hybrid valve assembly of FIG. 7.
Figure 10:
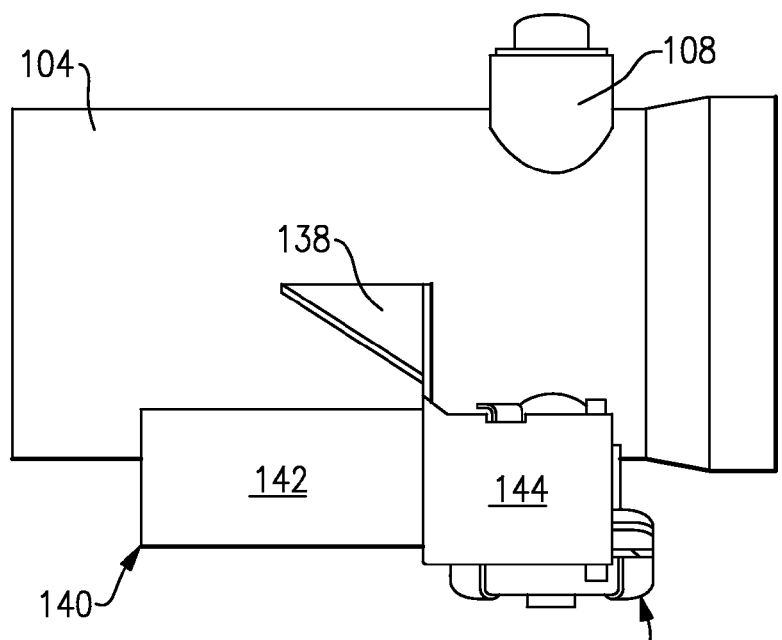
FIG. 10 is a top view of the hybrid valve assembly of FIG. 7.

The bracket 144 can be fixed to the tube 104 in any of various manners including welding, brazing, fastening, etc. Additional support brackets 138 can be used to more securely fix the bracket 144 in place, if needed. As shown in FIG. 9, a support bracket 138 is used to secure a portion of the bracket 144 to a side of the tube 104. In FIG. 10, a support bracket is used to secure a portion of the bracket to a top of the tube 104. Additional support brackets could also be used if needed.

The valve actuator 140 has an ON position where movement of the vane 110 is actively controlled by the valve actuator 140 and an OFF position where movement of the vane 110 is passively controlled by exhaust gas flow. When the valve actuator 140 is OFF, the hybrid valve assembly 102 is in a passive mode and the resilient member 122 exerts a biasing force to rotate the shaft 106 such that the vane 110 is in the closed position. During vehicle operation, when exhaust gas pressure exerted against the vane 110 is greater than the biasing force of the resilient member 122, the vane 110 will move toward the open position. When exhaust gas pressure is less than the biasing force, the vane 110 will automatically return to the closed position due to the biasing force of the resilient member 122. Thus, when in the passive mode, vane 110 is solely movable from the closed position toward the open position in response to exhaust gas pressure being greater than the biasing force of the resilient member 122, i.e. the valve actuator 140 does not actively control movement of the vane 110.

The first portion 126 of the retainer 124 includes a radially extending tab 150 that abuts against the arm 148 of the valve actuator 140 when in the closed position. In the passive mode, as exhaust gas pressure exceeds the biasing force of the resilient member 122, the tab 150 lifts off of the arm 148 to rotate toward the open position as indicated by the arrow 152. When exhaust gas pressure falls below the biasing force, the tab 150, shaft 106, and first portion 126 of the retainer 124 will rotate in an opposite direction until the tab 150 abuts against the arm 148. Thus, the arm 148 serves to define a stop limit for the closed position when in the passive mode.

During active control, i.e. when the actuator 140 is in an active mode in the ON position, the arm 148 moves with the extendible member 146 to rotate the shaft 106 and thereby the vane 110 via contact with the tab 150. As shown in FIG. 7, when the extendible member 146 is drawn inwardly into the housing 142, the arm 148 also moves in this same direction, which forces the tab 150 to rotate about the axis A (indicated by the arrow 152) against the biasing force of the spring regardless of the exhaust gas pressure. Thus, when in the active mode the arm 148 and tab 150 remain in contact with each other as the extendible member 146 moves inward and outward of the housing 144.

A controller 156, such as a separate or integrated electronic control unit, generates signals to control movement of the valve actuator 140. An input 158 is configured to be selectively actuated by a user to move the valve actuator 140 between the ON and OFF positions. Selection between the ON and OFF positions is based upon providing a desired valve characteristic. Signals from the input 158 are communicated to the controller 156 and the controller 156 generates an appropriate output control signal to activate (ON position) or deactivate (OFF position) the valve actuator 140 depending upon the signal received from the input 158. The input 158 can be actuated while driving or can be initiated before or at vehicle start-up.

The input 158 can comprise any of various methods or apparatus that are capable of communicating to the controller 156 that a change in valve control is desired. In one example, the input 158 comprises a switch, button, or toggle that is selectively actuated by the user. The input 158 could also be done through a vehicle computer via a touch screen, for example. In another example, the gas pedal could be used as an input device where a pre-determined set position or pre-determined number of brake applications within a short period of time could indicate a change in valve control is desired. One the controller 156 receives the change requests, the controller 156 is programmed with an algorithm to generate the appropriate control signals for the valve actuator 140.

As discussed above, selection between the ON and OFF positions is based upon providing a desired valve characteristic. In one example, the desired valve characteristic comprises a desired exhaust sound. When the ON position is selected, i.e. the hybrid valve assembly 102 is in the active mode, the exhaust sound is louder than when in the OFF position, i.e. when in the passive mode.

In another example, the desired valve characteristic comprises a desired back pressure. When in the ON position, i.e. active mode, the back pressure is lower than when in the OFF position, i.e. passive mode.

In another example, the desired valve characteristic comprises energy conservation. The user will select the ON position when there is a desire to use energy and will select the OFF position when there is a desire to conserve energy.

The hybrid valve assembly 102 integrates passive and active control in an easy and simple manner to provide a selective range of valve characteristic options.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve assembly for an exhaust system comprising:
an exhaust tube having a bore defining an exhaust flow path, said exhaust tube having one end to be connected to a first exhaust component and a second end to be connected to a second exhaust component;
a vane mounted within said bore and being moveable between an open position and a closed position;
a resilient member that biases said vane toward said closed position; and
a valve actuator having an ON position where movement of said vane is actively controlled by said valve actuator as said vane moves between a fully open position and a fully closed position and an OFF position where movement of said vane is passively controlled by exhaust gas flow as said vane moves between the fully open position and the fully closed position, and wherein the fully open position defines a maximum open area of the exhaust flow path and the fully closed position defines a minimum open area of exhaust flow path.

2. The valve assembly according to claim 1 wherein said vane provides 80% to 97% coverage of said exhaust flow path when in said fully closed position.

3. The valve assembly according to claim 1 wherein, when said valve actuator is in said ON position, said vane is coupled to said valve actuator such that movement of said valve actuator causes said vane to move from the closed position to the open position, and wherein, when said valve actuator is in said OFF position said vane is uncoupled from said valve actuator such that said vane is solely movable from said closed position toward said open position in response to exhaust gas pressure being greater than a biasing force of said resilient member.

4. The valve assembly according to claim 1 wherein said exhaust tube forms a sole exhaust path extending between the first and the second exhaust components, and wherein said vane comprises the only valve assembly positioned between the first and the second exhaust components.

5. The valve assembly according to claim 1 wherein at least one of the first and second exhaust components comprises a muffler.

6. The valve assembly according to claim 5 wherein the other of the first and second exhaust components comprises one of a tailpipe and another muffler.

7. The valve assembly according to claim 1 wherein the valve actuator includes an extendible member that extends in an axial direction that is transverse to an axis of rotation defined by a shaft that supports said vane, and including a rigid arm that extends outwardly from the extendible member and a radially extending tab fixed for rotation with the shaft, and wherein said arm abuts against said radially extending tab to cause said vane to move from the closed position toward the open position when in the ON position.

8. The valve assembly according to claim 7 wherein said actuator comprises a linear actuator having an extendible member that moves along a linear path, and wherein said arm is fixed for movement with said extendible member.

9. The valve assembly according to claim 1, wherein said exhaust flow path has a cross-sectional area, and wherein said vane provides 80% to 97% coverage of said cross-sectional area when in said closed position.

10. The valve assembly according to claim 1 wherein the vane pivots about an axis of rotation, and wherein the valve actuator comprises a housing, an extendible member moveable relative to the housing, and a rigid arm extending transversely to the extendible member, and wherein the rigid arm extends in a direction that is generally parallel to the axis of rotation.

11. A valve assembly for an exhaust system comprising:
an exhaust tube having a bore defining an exhaust flow path said exhaust tube having one end to be connected to a first exhaust component and a second end to be connected to a second exhaust component;
a vane mounted within said bore and being moveable between an open position and a closed position;
a resilient member that biases said vane toward said closed position;

a shaft mounted to said vane, said shaft being pivotally supported by at least one bushing, and wherein said resilient member comprises a spring that is supported on said shaft; and a valve actuator having an ON position where movement of said vane is actively controlled by said valve actuator as said vane moves between a fully open position and a fully closed position and an OFF position where movement of said vane is passively controlled by exhaust gas flow as said vane moves between the fully open position and the fully closed position.

12. The valve assembly according to claim 11 including a spring retainer having a rotating portion fixed for rotation with said shaft, and wherein said valve actuator is configured to control movement of said vane by rotating said rotating portion when said valve actuator is in said ON position.

13. The valve assembly according to claim 12 wherein said spring retainer includes a radially extending tab and wherein said valve actuator includes an arm that abuts against said radially extending tab.

14. The valve assembly according to claim 13 wherein, when said valve actuator is in said OFF position, said arm comprises an abutment stop that defines the closed position, and wherein when said valve actuator is in said ON position, said arm abuts against and rotates said radially extending tab to move said vane toward said open position.

15. A valve assembly for an exhaust system comprising:
an exhaust tube having a bore defining an exhaust flow path, said exhaust tube having one end to be connected to a first exhaust component and a second end to be connected to a second exhaust component;
a vane mounted within said bore and being moveable between an open position and a closed position;
a resilient member that biases said vane toward said closed position;
a valve actuator having an ON position where movement of said vane is actively controlled by said valve actuator as said vane moves between a fully open position and a fully closed position and an OFF position where movement of said vane is passively controlled by exhaust gas flow as said vane moves between the fully open position and the fully closed position; and
an input configured to be selectively actuated by a user to move said valve actuator between said ON and said OFF positions, and wherein selection between said ON and said OFF positions is based upon providing a desired valve characteristic.

16. The valve assembly according to claim 15 wherein said desired valve characteristic comprises a desired exhaust sound, and wherein when in said ON position said exhaust sound is louder than when in said OFF position.

17. The valve assembly according to claim 15 wherein said desired valve characteristic comprises a desired back pressure, and wherein when in said ON position said back pressure is lower than when in said OFF position.

18. A method of controlling a valve assembly comprising the steps of:
providing an exhaust tube having a bore defining an exhaust flow path, a vane mounted within the bore and being moveable between an open position and a closed position, and a resilient member that biases the vane toward the closed position; and
selectively moving a valve actuator between an ON position where movement of the vane is actively controlled by the valve actuator as the vane moves between a fully closed position and a fully open position and an OFF position where movement of the vane is passively controlled by exhaust gas flow as the vane moves between the fully open position and the fully closed position; and
providing an input configured to be selectively actuated by a user to move the valve actuator between the ON and OFF positions, and wherein selection between the ON and OFF positions is based upon providing a desired valve characteristics that includes at least one of a desired exhaust sound or a desired back pressure.

19. The method according to claim 18 wherein the exhaust flow path has a cross-sectional area, and including covering 80% to 97% coverage of the cross-sectional area with the vane when in the closed position.

20. The method according to claim 18 wherein selection between the ON and the OFF positions is based upon providing the desired exhaust sound, and including selecting the ON position to provide a louder exhaust sound than when in the OFF position.

21. The method according to claim 18 wherein selection between the ON and the OFF positions is based upon providing the desired back pressure, and including selecting the ON position to provide a lower back pressure than when in the OFF position.

22. The method according to claim 18 wherein the fully open position defines a maximum open area of exhaust flow path and the fully closed position defines a minimum open area of exhaust flow path, and wherein, when the valve actuator is in the ON position, including a step of coupling the vane to the valve actuator such that movement of the valve actuator causes the vane to move from the closed position to the open position, and wherein, when the valve actuator is in the OFF position, including a step of uncoupling the vane from the valve actuator such that the vane is solely movable from the closed position toward the open position in response to exhaust gas pressure being greater than a biasing force of the resilient member.

23. The method according to claim 18 wherein the valve actuator comprises a housing, an extendible member moveable relative to the housing, and a rigid arm extending transversely to the extendible member, and including the steps of pivoting the vane about an axis of rotation and extending the arm in a direction that is generally parallel to the axis of rotation.

24. A valve assembly for an exhaust system comprising:
an exhaust tube having a bore defining an exhaust flow path, said exhaust tube having one end to be connected to a first exhaust component and a second end to be connected to a second exhaust component;
a vane mounted within said bore and being moveable between a fully open position that defines a maximum open area of exhaust flow path and a fully closed position that defines a minimum open area of exhaust flow path;
a resilient member that biases said vane toward said fully closed position;
a valve actuator having a housing, and extendible member moveable relative to the housing, and a rigid arm extending transversely to the extendible member; and
wherein the valve is configured to be operated in at least one of a passive control and an active control via the valve actuator as the vane moves between the fully open position and the fully closed position.

25. The valve assembly according to claim 24 wherein the valve is configured to be selectively operated in at least one of the passive control and the active control by controlling the valve actuator that has an ON position where said valve actuator is coupled to said vane and movement of said vane is only actively controlled by said valve actuator as said vane moves between the fully open position and the fully closed position, and an OFF position where said valve actuator is uncoupled from said vane and movement of said vane is only passively controlled by exhaust gas flow as said vane moves between the fully open position and the fully closed position.

26. The valve assembly according to claim 25 wherein, when said valve actuator is in said OFF position, said vane is solely movable from said closed position toward said open position in response to exhaust gas pressure being greater than a biasing force of said resilient member.

27. The valve assembly according to claim 25 wherein said exhaust tube defines a center axis extending in a direction with the exhaust flow path, and wherein said resilient member is configured to rotate said vane about an axis of rotation that is transverse to the center axis, and wherein said valve actuator comprises a linear actuator having an extendible member that is moveable along a linear path in a direction transverse to the axis of rotation.

28. The valve assembly according to claim 27 including a spring retainer having a rotating portion fixed for rotation with said vane, said rotating portion including a radially extending tab, and wherein said arm engages said tab.

29. The valve assembly according to claim 25 including an input configured to be selectively actuated by a user to move said valve actuator between said ON and said OFF positions, and wherein selection between said ON and said OFF positions is based upon providing a desired valve characteristic.

30. The valve assembly according to claim 24 wherein said vane provides 80% to 97% coverage of said exhaust flow path when in said fully closed position.

31. The valve assembly according to claim 24 wherein the vane pivots about an axis of rotation, and wherein the arm extends in a direction that is generally parallel to the axis of rotation.

32. The valve assembly according to claim 24 including a shaft that supports the vane for rotation about an axis, and wherein the axis is offset from a center of the vane.

33. A method of controlling a valve assembly comprising the steps of:
   providing an exhaust tube having a bore defining an exhaust flow path, a vane mounted within the bore and being moveable between an open position and a closed position, and a resilient member that biases the vane toward the closed position; and
   selectively moving a valve actuator between an ON position where movement of the vane is actively controlled by the valve actuator as the vane moves between a fully closed position and a fully open position and an OFF position where movement of the vane is passively controlled by exhaust gas flow as the vane moves between the fully open position and the fully closed position; and
   wherein the valve actuator comprises a housing, an extendible member moveable relative to the housing, and a rigid arm extending transversely to the extendible member, and including the steps of, when in the ON position, moving the extendible member in an axial direction and engaging the arm against a radially extending tab to cause the vane to move from the closed position toward the open position.

* * * * *